US011215161B2

(12) United States Patent
Miller et al.

(10) Patent No.: US 11,215,161 B2
(45) Date of Patent: Jan. 4, 2022

(54) RETROFIT WINGLETS FOR WIND TURBINES

(71) Applicant: Wichita State University, Wichita, KS (US)

(72) Inventors: Leonard Scott Miller, Wichita, KS (US); Vijay Matheswaran, Wichita, KS (US)

(73) Assignee: Wichita State University, Wichita, KS (US)

( * ) Notice: Subject to any disclaimer, the term of this patent is extended or adjusted under 35 U.S.C. 154(b) by 270 days.

(21) Appl. No.: 16/186,876

(22) Filed: Nov. 12, 2018

(65) Prior Publication Data

US 2019/0145375 A1     May 16, 2019

Related U.S. Application Data

(60) Provisional application No. 62/585,179, filed on Nov. 13, 2017.

(51) Int. Cl.
*F03D 1/06*     (2006.01)

(52) U.S. Cl.
CPC ......... *F03D 1/0675* (2013.01); *F03D 1/0633* (2013.01); *F05B 2230/80* (2013.01);
(Continued)

(58) Field of Classification Search
CPC .. F03D 1/0675; F03D 1/0633; F05B 2230/80; F05B 2240/301;
(Continued)

(56) References Cited

U.S. PATENT DOCUMENTS

| 9,103,325 B2 * | 8/2015 | Koegler ................ F03D 1/0675 |
| 2010/0135816 A1 * | 6/2010 | Cairo .................... F03D 1/0675 |
| | | 416/226 |

(Continued)

FOREIGN PATENT DOCUMENTS

JP     2004084590 A     3/2004

OTHER PUBLICATIONS

Gyatt, G.W., Lissaman, P.B.S., "Development and Testing of Tip Devices for Horizontal Axis Wind Turbines," NASAS CR-174991, May 1985.

(Continued)

*Primary Examiner* — Aaron R Eastman
(74) *Attorney, Agent, or Firm* — Stinson LLP

(57) ABSTRACT

A winglet is provided for retrofitting to a wind turbine. Aerodynamic and centrifugal forces for winglets having a range of configurations including winglet height, taper ratio, twist, and cant angle are modeled, wherein the winglet height, taper ratio, twist, and cant angle are used to define a grid in a Vector Lattice. An increase in a coefficient of power $C_p$ of each winglet design when applied to a predetermined main blade of the wind turbine can be determined. A winglet configuration can then be selected wherein the coefficient of power $C_p$ of the main blade and winglet is at least 2% greater than the coefficient of power $C_p$ of the main blade alone, and wherein a ratio of normal aerodynamic force generated by the winglet to centrifugal force generated by the winglet during rotation at a nominal rated speed is in a range between 0.75 and 2.

21 Claims, 15 Drawing Sheets

(52) U.S. Cl.
CPC ............... *F05B 2240/301* (2013.01); *F05B 2280/2001* (2013.01); *F05B 2280/4002* (2013.01); *F05B 2280/6003* (2013.01); *F05B 2280/6012* (2013.01)

(58) Field of Classification Search
CPC ...... F05B 2280/2001; F05B 2280/4002; F05B 2280/6003; F05B 2280/6012
See application file for complete search history.

(56) References Cited

U.S. PATENT DOCUMENTS

| | | | |
|---|---|---|---|
| 2011/0142642 A1 | 6/2011 | McGrath et al. | |
| 2011/0243736 A1* | 10/2011 | Bell | F03D 1/0683 416/132 R |
| 2014/0140854 A1* | 5/2014 | Kirkegaard | F03D 1/0675 416/230 |
| 2014/0234116 A1* | 8/2014 | Cussac | F03D 1/0675 416/226 |
| 2015/0240780 A1* | 8/2015 | Leonard | F03D 1/0675 416/204 R |
| 2017/0145986 A1* | 5/2017 | Baehmann | B33Y 10/00 |

OTHER PUBLICATIONS

Johansen, J., Sorenson, N.N. "Aerodynamic Investigations of Winglets on Wind Turbine Blades using CFD," Risø National Laboratory, Roskilde, Denmark, Feb. 2006.

Jonkman, J., Butterfield, S., Musial, W., Scott, G., "Definiation of a 5-MW Reference Wind Turbine for Offshore System Development," NREL/TP-500-38060, Feb. 2009.

Abedi, Hamidreza, "Development of Vortex Filament Methods for Wind Turbine Aerodynamic Loads on Rotor Blades," Thesis for Licentiate of Engineering, Department of Applied Mechanics, Chalmers University of Technology, Gothenburg, Sweden, 2013.

* cited by examiner

RETROFIT WINGLETS FOR WIND TURBINES

CROSS REFERENCE TO RELATED APPLICATIONS

This application claims the benefit of U.S. Provisional Application Ser. No. 62/585,179, filed Nov. 13, 2017, the entirety of which is incorporated herein by reference.

STATEMENT REGARDING FEDERALLY SPONSORED RESEARCH

Not Applicable.

BACKGROUND

The present disclosure relates to wind turbines, and, more specifically, to winglets for retrofitting onto wind turbine blades.

Blade tip vortices emanating off the tip of a wind turbine blade during wind-driven movement leads to induced drag and reduced power generation in a wind turbine. In aircraft, winglets (also called wingtip devices) have been applied to reduce the generation of these tip vortices, thereby reducing induced drag. Similarly, winglets have been used at the tip of a wind turbine blade in order to improve power generation. Previous designs, however, have focused on large, heavy winglets aimed at increasing the power coefficient. The large, heavy winglets are bulky so that the winglets can withstand operational loads while reducing the effect of blade tip vortices. To withstand the added bending moments caused by the heavy winglets, the main blade must be structurally reinforced, resulting in significantly higher costs of retrofitting a winglet to a wind turbine blade.

SUMMARY

In one embodiment, the present disclosure relates a wind turbine having a main blade and a winglet. The main blade is arranged for wind-driven rotation in a vertical plane. The winglet extends from a tip of the main blade away from the vertical plane. The coefficient of power $C_p$ of the main blade and winglet is at least 2% greater than a coefficient of power $C_p$ of the main blade alone. A ratio of normal aerodynamic force generated by the winglet to centrifugal force generated by the winglet during rotation at a nominal speed is in a range between 0.75 and 2.

In another embodiment, the present disclosure relates to a winglet for retrofitting to a main blade of a wind turbine. The winglet includes a load bearing balsa spar, a foam core embedded with the spar, and a fiberglass skin over the spar. The winglet is configured to extend from a tip of the main blade away from a vertical plane of the main blade. A coefficient of power $C_p$ of the main blade and winglet is at least 2% greater than a coefficient of power $C_p$ of the main blade alone. A ratio of normal aerodynamic force generated by the winglet to centrifugal force generated by the winglet during rotation at a nominal speed is in a range between 0.75 and 2.

In yet another embodiment, the present disclosure relates to a method of designing a winglet for a wind turbine. The method includes the step of modeling aerodynamic and centrifugal forces of winglets having a range of configurations including winglet height, taper ratio, twist, and cant angle, wherein the winglet height, taper ratio, twist, and cant angle are used to define a grid in a Vector Lattice. The method further includes the step of determining a coefficient of power $C_p$ of the winglet when applied to a predetermined main blade of the wind turbine. The method further includes the step of selecting a winglet configuration wherein a ratio of normal aerodynamic force generated by the winglet to centrifugal force generated by the winglet during rotation at a nominal rated speed is in a range between 0.75 and.

A further understanding of the disclosure will be obtained from the following detailed descriptions and accompanying drawings, which set forth illustrative embodiments that are indicative of the various ways in which the principals of the disclosure may be employed.

DETAILED DESCRIPTION OF PREFERRED EMBODIMENTS

Figure 1:
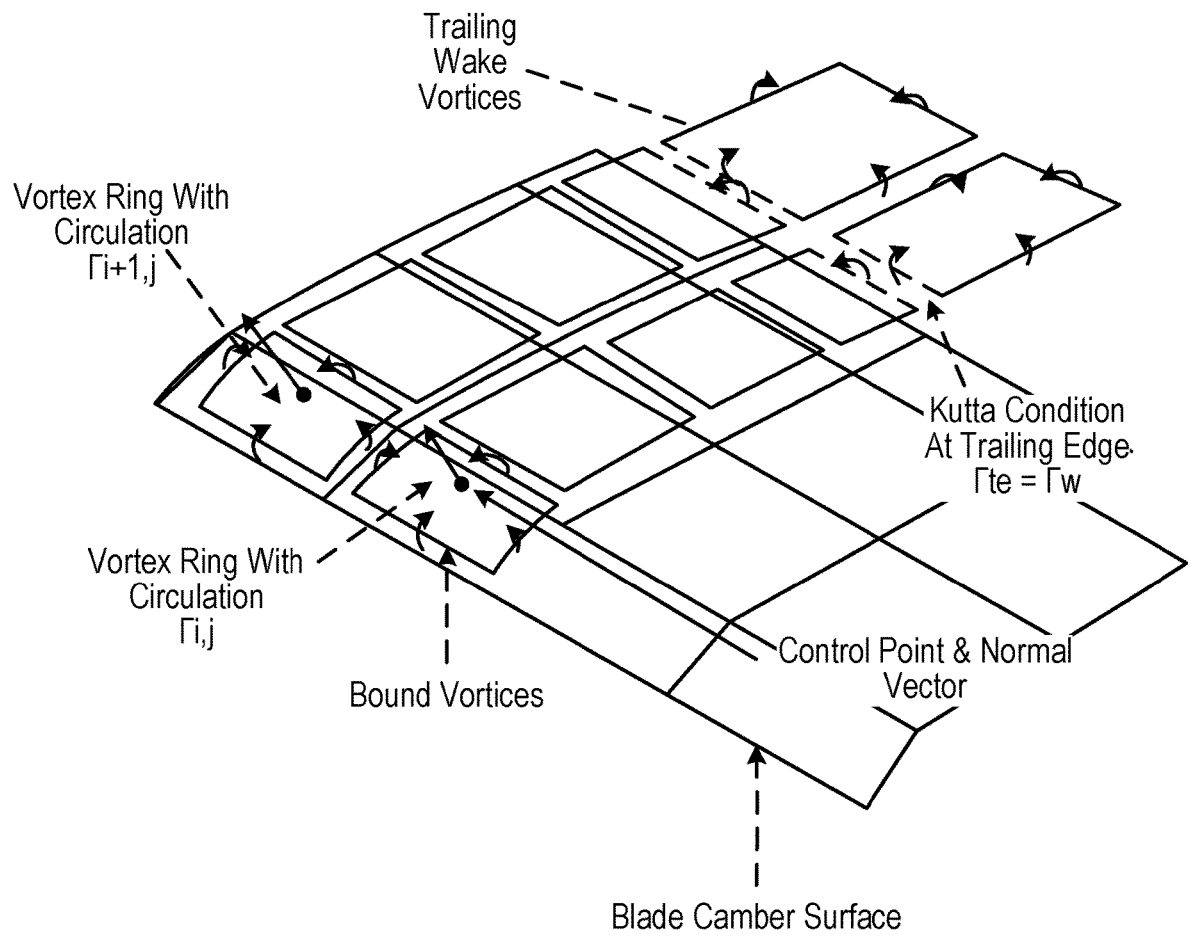
FIG. 1 is a perspective view of a generalized blade model for illustrating a blade camber surface.

The disclosure constructs winglets using light yet strong materials. This will minimize mass, and consequently, centrifugal force. The disclosure configures winglet twist, height, and taper so that the generated normal aerodynamic force balances centrifugal force (or is within a predetermined threshold of balancing them). With the forces balanced, and with the winglet being made of light material, this design methodology leads to a winglet that does not require the costs of structurally reinforcing the main blade of the turbine.

In a preferred embodiment, a winglet is constructed using foam, fiberglass, polyester resin, and balsa, making it light yet strong. The winglet is configured such that normal aerodynamic force vector and centrifugal force vector are close to being balanced (i.e., equal and opposite to within a predetermined threshold).

Traditional methods to determine power output of a wind turbine, such as the blade element momentum theory, are insufficient to model a wind turbine with winglets. A vortex lattice method for rotor applications is disclosed herein which provides appropriate modeling of a wind turbine and winglets to compare the results obtained for diverse winglet design parameters. Moreover, economic feasibility is a key issue in the wind industry today. Accordingly, a novel cost function is used in the disclosure that compares design, manufacturing, and labor costs against incremental increases in power generation. Using these tools, potential winglet designs with varying construction techniques and design parameters can be investigated and compared. The result is a winglet configuration that, at minimum installation cost, provides optimized performance and economic benefits.

To illustrate the disclosure, potential retrofit winglet designs for retrofitting onto an NREL 5MW reference wind turbine are described for improving power output. Keeping in mind the objectives and economics of the wind industry today, key constraints are applied to the design process: 1) there should be no need to structurally reinforce the blade in order to employ the winglet, and 2) the winglet should be economically feasible. The first is accomplished by designing a winglet wherein the aerodynamic and centrifugal loads balance themselves to within a threshold, thereby minimizing the need for structural reinforcement. Secondly, the retrofit winglet is designed to be light and cheap, ensuring economic feasibility. As with any design process, the right tools are a necessity to arrive at an optimum design. Appropriate aerodynamic and economic tools are developed to aid with the design process and determine feasibility. For example, understanding the flow around a wind turbine and gauging the effects of a winglet designed for the blade tip calls for a sound mathematical model predicting the aerodynamic forces and moments on a rotor. A vortex lattice method with a prescribed wake is a time-effective and acceptably accurate method of modeling flow around a wind turbine. The Vortex Lattice Method presented herein preferably incorporates three-dimensional numerical solutions such as those explained in Katz and Plotkin, *Low Speed Aerodynamics: From Wing Theory to Panel Methods*, 1$^{st}$ ed., McGraw-Hill Inc., 1991.

In exploring the retrofit aspect of winglets, it is desirable to take into account the vast numbers of wind turbines currently in operation that could see a power improvement when utilizing winglets. In addition, retrofitting winglets should not lead to logistical challenges in transportation or installation. Secondly, unlike prior studies, a primary constraint set for the retrofit winglets designed in this disclosure is that they must not cause a significant increase in root bending moments. This aspect is extremely significant as it ties into the idea of developing an economical winglet. A winglet wherein the generated winglet normal aerodynamic and centrifugal loads are not balanced would undesirably cause an increase in blade root bending moment. An increase in blade root bending moment would require the blade to be structurally reinforced, an expensive proposition that might negate any economic benefit derived from retrofitting a wind turbine with winglets in the first place.

Numerical methods, such as vortex lattice, lifting line, and lifting surface methods, come under the category of potential flow theory or vortex theory. The underlying assumptions that govern potential flow theory is that flow is incompressible ($\nabla \cdot \bar{V}=0$), inviscid, and irrotational ($\nabla \times \bar{V}=0$). For these assumptions, we can define a velocity potential ($\Phi$), such that the velocity at each point is given by its gradient:

$$\bar{V} = \nabla \Phi \tag{2.1}$$

Substituting equation (2.1) into the continuity equation leads to Laplace's equation, a linear differential equation for the velocity potential:

$$\nabla^2 \Phi = 0 \tag{2.2}$$

Thus, it is seen that for irrotational, inviscid, and incompressible flow, the solution of Laplace's equation allows one to obtain the velocity field. In order to obtain a unique solution, boundary conditions and an elementary singularity solution must be specified.

German scientist Hermann von Helmholtz developed three vortex theorems, which are summarized by Katz and Plotkin as follows:

1. The strength of a vortex filament is constant along its length.
2. A vortex filament cannot start or end in a fluid (it must form a closed path or extend to infinity).
3. The fluid that forms a vortex tube continues to form a vortex tube and the strength of the vortex tube remains constant as the tube moves about (vortex elements will remain vortex elements with time).

This implies that vorticity is only generated at solid boundaries, and that they can be considered a surface of vorticity. Hence, we can replace a solid surface in contact with a fluid by a surface of vorticity. This allows us to use the vortex line as our singularity element and solve Laplace's equation. Thus, the wing and wake can be replaced by vortex ring elements, consisting of vortex filaments.

The velocity induced by vortex filament is given by the Biot-Savart Law. For ease of numerical computations, Katz and Plotkin represent the Biot-Savart law as:

$$\bar{V}_{ind} = \frac{\Gamma}{4\pi} \frac{\bar{r}_1 \times \bar{r}_2}{|\bar{r}_1 \times \bar{r}_2|^2} \bar{r}_0 \left( \frac{\bar{r}_1}{r_1} - \frac{\bar{r}_2}{r_2} \right) \tag{2.4}$$

Here, $\Gamma$ depicts the strength of the vortex element, $\bar{r}_1$ and $\bar{r}_2$ are the vectors from an arbitrary point P to the start and end points of the vortex filament respectively, $\bar{r}_0$ is defined as:

$$\bar{r}_0 = \bar{r}_2 - \bar{r}_1 \tag{2.5}$$

The Biot-Savart law is singular when the point of evaluation P is located on the vortex filament.

It is noted that the formulation of the Biot-Savart law shown above is indeterminate whenever $\bar{r}_1$ and $\bar{r}_2$ are collinear, even if the points lie outside the vortex segment. An adaptation of the Biot-Savart law is:

$$\bar{V}_{ind} = \frac{\Gamma}{4\pi} \frac{(\bar{r}_1 \times \bar{r}_2)(r_1 + r_2)}{r_1 r_2 (r_1 r_2 + \bar{r}_1 \cdot \bar{r}_2)} \tag{2.6}$$

The definitions of $\bar{r}_2$, $\bar{r}_1$ are as described previously. In addition, if the arbitrary evaluation point P is very close to the vortex filament, the formulation yields unrealistically large induced velocities. In order to rectify this, it is preferable to use a cut-off radius. Thus, the formulation of the Biot-Savart law can be rewritten to include a cut-off radius $\delta$.

$$\bar{v}_{ind} = \frac{\Gamma}{4\pi} \frac{(\bar{r}_1 \times \bar{r}_2)(r_1 + r_2)}{r_1 r_2 (r_1 r_2 + \bar{r}_1 \cdot \bar{r}_2) + (\delta r_0)^2} \quad (2.7)$$

With this notation of the Biot-Savart law and representing the blade surface as a surface of vorticity, it is possible to calculate rotor induced velocities at the rotor plane.

In order to implement the Vortex Lattice Method, a grid must be generated. This is done by discretizing the blade camber surface into chordwise and spanwise panels. The singularity elements used are vortex rings. Each blade panel is overlaid with a vortex ring of strength $\Gamma$, thus representing it as a surface of vorticity. Here, positive circulation is determined using the Right Hand Rule. In addition, to satisfy the two-dimensional Kutta condition, the leading segment of each vortex ring is placed at the quarter-chord line of each panel. Counters are assigned in the spanwise and chordwise directions, so the strength of each vortex panel is represented as $\Gamma_{ij}$, where i denotes the spanwise counter, while j denotes the chordwise counter. Given that the circulation gradient can be quite large close to the tip and root of the rotor blade, it is recommended that the concentration of grid panels be increased in these areas. A cosine grid spacing for the blade can be used for this reason.

Similar to the blade, the wake and wake panels must also be generated. Vortex lattice methods with a free wake work by determining the exact path of trailing vortices iteratively. While more accurate, these methods are complex and computationally more demanding, and also include the possibility of leading to diverging solutions. For the purpose of this preferred embodiment, a vortex lattice method with a prescribed (rigid) wake provides sufficiently accurate results, and hence will be used. For the initial wake geometry, the wake is described as a helix, given by the following equations:

$x = V_\infty t$ $y = r_i \sin(\Omega t + \theta_t)$ $z = r_i \cos(\Omega t + \theta_t) \quad (2.8)$ Here, $V_\infty$ denotes freestream velocity, t is time, $r_i$ is blade section radius, $\Omega$ is blade rotational velocity in radian/s, and $\theta_t$ is blade section twist. Recalling that inviscid, incompressible, and irrotational flows are underlying assumptions of the model, the wake vortices can be expected to extend up to infinity. Modeling the wake to extend to infinity is both unrealistic and inefficient. The velocity induced by a wake panel on the first blade panel five diameters downstream is of the order of $10^{-6}$ m/s. As this is close to negligible, it preferable to model the wake to a distance approximately equal to five diameters downstream of the turbine. FIG. 1 shows the blade surface panel overlaid with vortex rings. Also depicted are control points and unit normal vectors.

Having set up the blade and wake panels, the coordinates of the collocation (or control) points must be calculated. Circulation (bound vortex strength) and velocities induced by the trailing wake vortices are calculated at this point. These collocation points are located at the mid-point of each vortex ring (which is the three-quarter chord point of each blade panel). At this point, the normal vector at each control point is also defined. FIG. 1 depicts the blade camber surface. For the sake of clarity, only a small segment of it and the generated wake are discretized into panels. The selected vortex ring singularities are based on the vortex line solution of the incompressible continuity equation. In order to obtain a solution, the flow tangency boundary condition must be satisfied, that is, there should be zero normal flow across the boundary. In terms of velocity potential this can be written as:

$\nabla(\Phi + \Phi_\infty) \cdot \bar{n} = 0 \quad (2.9)$

That is, the sum of the normal component of the freestream and perturbation velocity potential must be zero. Rewriting in terms of velocities, provides the equation $(\bar{v}_\infty + \bar{v}_{ind,bound} + \bar{v}_{ind,wake} + \bar{v}_{rot}) \cdot \bar{n} = 0 \quad (2.10)$ Here, $\bar{v}_\infty$ is the freestream inflow velocity, $\bar{v}_{ind,bound}$ is the velocity induced by the vortex segments of the bound vortices, $\bar{v}_{ind,wake}$ is the velocity induced by the vortex segments of the trailing wake vortices, and $\bar{v}_{rot}$ is the rotational velocity component ($\bar{v}_{rot} = \bar{\Omega} \times \bar{r}$). The induced velocities, both due to the blade bound vortices and the trailing wake vortices, are calculated using the Biot-Savart Law. In order to solve for the circulation distribution across the blade, it is necessary to initialize a solution with some value of $\Gamma$ (circulation). This is done by initializing a solution for equation (2.10) with $\Gamma = 1$.

At this point, it is possible to shift the normal components of the known velocity components to the right hand side of equation (2.10). Thus, applying the zero normal flow boundary condition at each colocation point, a system of equations can be constructed as shown below:

$$a_{11}\Gamma_1 + a_{12}\Gamma_2 + \cdots a_{1N}\Gamma_N = -(\bar{v}_\infty + \bar{\Omega} \times \bar{r}) \cdot \bar{n}_1 \quad (2.11)$$
$$a_{21}\Gamma_1 + a_{22}\Gamma_2 + \cdots a_{2N}\Gamma_N = -(\bar{v}_\infty + \bar{\Omega} \times \bar{r}) \cdot \bar{n}_2$$
$$\cdots$$
$$a_{N1}\Gamma_1 + a_{N2}\Gamma_2 + \cdots a_{NN}\Gamma_N = -(\bar{v}_\infty + \bar{\Omega} \times \bar{r}) \cdot \bar{n}_N$$

Here, N denotes the total number of blade collocation points (for all three blades), $a_{ij}$ denotes the influence coefficient of a certain collocation point, calculated as the sum of the normal bound and trailing velocities induced by a vortex ring of strength one ($\Gamma = 1$) at the concerned collocation point. Thus, $a_{ij}$ is the influence of the $j^{th}$ vortex ring on the $i^{th}$ blade collocation point, written as:

$a_{ij} = (\bar{v}_{i,j\,ind\,bound} + \bar{v}_{i,j\,ind\,trailing}) \cdot \bar{n}_i \quad (2.12)$ Rewriting the system of equations (2.11) as matrices, we have:

$$\begin{pmatrix} a_{11} & \cdots & a_{1N} \\ \vdots & \ddots & \vdots \\ a_{N1} & \cdots & a_{NN} \end{pmatrix} \begin{pmatrix} \Gamma_1 \\ \vdots \\ \Gamma_N \end{pmatrix} = - \begin{pmatrix} (\bar{v}_\infty + \bar{\Omega} \times \bar{r}) \cdot \bar{n}_1 \\ \vdots \\ (\bar{v}_\infty + \bar{\Omega} \times \bar{r}) \cdot \bar{n}_N \end{pmatrix} \quad (2.13)$$

In order to compute the circulation distribution, it is necessary to specify the Kutta condition ($\gamma = 0$) at the trailing edge of the blade. This is done by specifying that the strength of the trailing vortex rings must be equal to the blade vortex ring at the trailing edge, allowing the trailing vortex of the last panel to be cancelled out. Since the strength of the wake vortex panels do not change with time, they can be converted to trailing horseshoe vortices. Thus, the effect of each trailing wake panel is added to the last chordwise panel of its respective spanwise segment. The circulation matrix can now be solved for the circulation distribution across the blade. The correct induced velocities can be determined using the computed circulation values. Having calculated the induced velocities, it is possible to calculate effective angles of attack at each spanwise section. The geometric angles of attack at the blade sections are computed as:

$$\alpha_{geom} = \tan^{-1}\left(\frac{\overline{v}_n}{\overline{v}_t}\right) \quad (2.14)$$

Here, $\overline{v}_n$ is the sum of the rotational and freestream velocity normal to the blade, while $\overline{v}_t$ is the sum of the rotational and freestream velocity tangent to the blade. As one may expect, velocities induced by the trailing wake leads to a reduction in the angle of attack. This angle of attack, termed the effective angle of attack, is calculated as:

$$\alpha_{eff} = \tan^{-1}\left(\frac{\overline{v}_{tot,n}}{\overline{v}_{tot,t}}\right) \quad (2.15)$$

Here, $\overline{v}_{tot}$ is the total velocity, written as:

$$\overline{v}_{tot} = \overline{v}_\infty + \overline{v}_{ind.,bound} + \overline{v}_{ind,wake} + \overline{\Omega} \times \overline{r} \quad (2.16)$$

$\overline{v}_{tot,n}$ and $\overline{v}_{tot,t}$ are the total velocity components normal and tangential to the blade, respectively.

In an effort to quantify viscous effects, two-dimensional airfoil data is used to calculate lift and drag forces. With the effective angle of attack at each spanwise section having been calculated, it is possible to determine section lift and drag coefficients, and subsequently lift and drag forces, for airfoil sections across the blade span. These are decomposed into tangential and normal forces, and are used to compute the power generated by the wind turbine. Using the induced velocities, the wake geometry can be updated by:

$$x = \overline{v}_{upd} t$$
$$y = r_i \sin(\Omega_{upd} t + \theta_i)$$
$$z = r_i \cos(\Omega_{upd} t + \theta_i) \quad (2.17)$$

Here, $\overline{v}_{upd} = \overline{v}_\infty + \overline{v}_{ind,x}$, $$\Omega_{upd} = \Omega + \frac{v_{ind,circ.}}{r_i}.$$

The wake is continually updated until the difference between successive computed power values is marginal.

The Vortex lattice method may preferably be implemented using MATLAB, with model and grid generation done using Vehicle Sketch Pad (OpenVSP), an open source software released under the NASA Open Source Agreement.

To demonstrate the effects of retrofit winglets, it is essential to have a baseline wind turbine to compare to, and to design the winglets for. Several commercial designs currently in use can be considered. However, much of the important design characteristics of such wind turbines remain proprietary. Therefore, the NREL 5MW reference wind turbine [see, Jonkman, J., Butterfield, S., Musial, W., Scott, G., "Definition of a 5-MW Reference Wind Turbine for Offshore System Development," NREL/TP-500-38060, February 2009] has been selected as the baseline wind turbine. The NREL 5MW reference wind turbine is a conceptual three-bladed upwind turbine that was primarily designed to support concept studies. It is heavily based on the Repower 5MW wind turbine; however, in cases where detailed information is not available, data from publicly available conceptual studies is used. The excellent and extensive information available, and the ease with which it could be obtained are key factors in selecting the NREL 5MW reference wind turbine as the baseline wind turbine. Table 2 lists the specifications of the NREL 5MW reference wind turbine.

TABLE 2

SPECIFICATIONS OF THE NREL 5MW REFERENCE WIND TURBINE

| Radial Position (m) | Chord (m) | Twist (°) | Airfoil |
|---|---|---|---|
| 11.75 | 4.557 | 13.308 | DU40_A17 |
| 15.85 | 4.652 | 11.480 | DU35_A17 |
| 19.95 | 4.458 | 10.162 | DU35_A17 |
| 24.05 | 4.249 | 9.011 | DU30_A17 |
| 28.15 | 4.007 | 7.795 | DU25_A17 |
| 32.20 | 3.748 | 6.544 | DU25_A17 |
| 36.35 | 3.502 | 5.361 | DU21_A17 |
| 40.45 | 3.256 | 4.188 | DU21_A17 |
| 44.55 | 3.010 | 3.125 | NACA64_618 |
| 48.65 | 2.764 | 2.319 | NACA64_618 |
| 52.75 | 2.518 | 1.526 | NACA64_618 |
| 56.16 | 2.313 | 0.863 | NACA64_618 |
| 58.90 | 2.086 | 0.370 | NACA64_618 |
| 61.63 | 1.419 | 0.106 | NACA64_618 |

Figure 2:
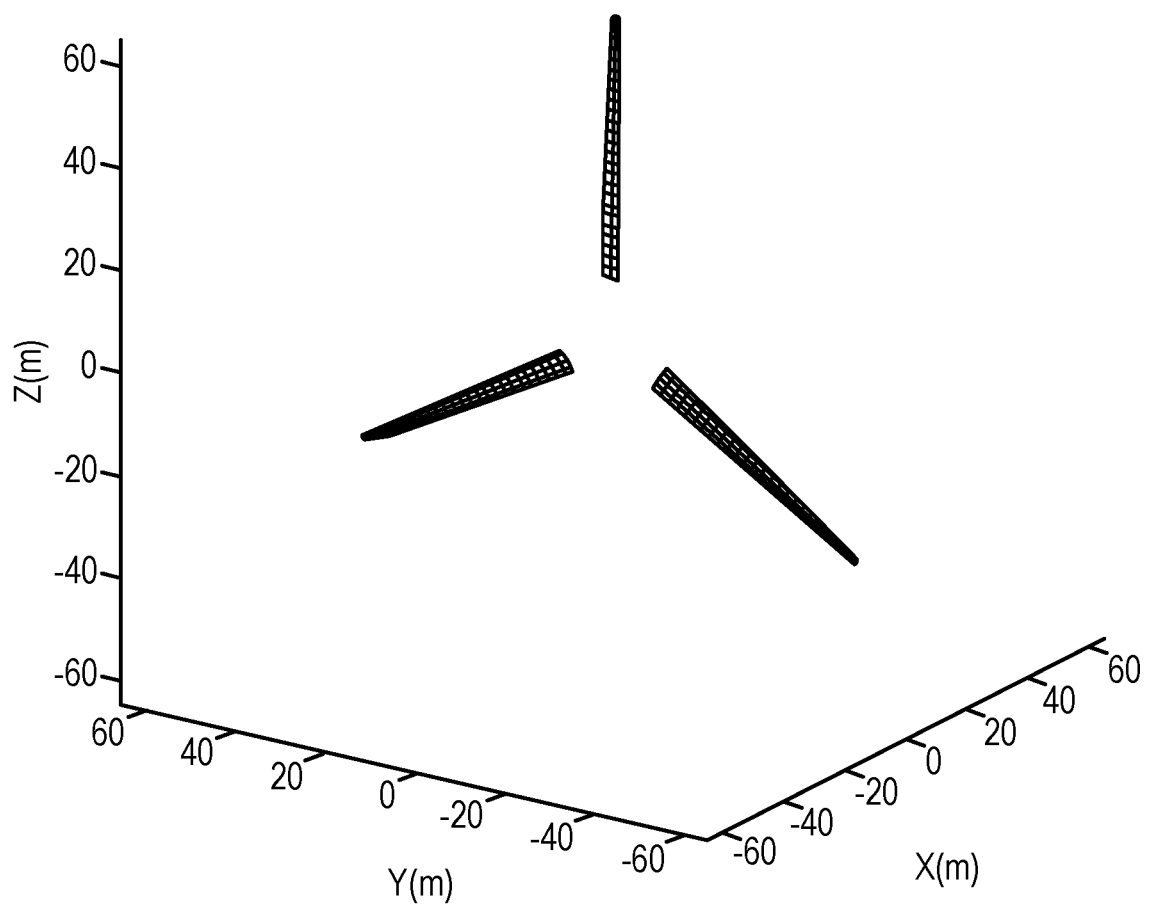
FIG. 2 is a three-dimensional plot showing a typical blade geometry for three blades as arranged for a typical wind turbine.

It was elected to use Vehicle Sketch Pad (OpenVSP) to model the geometry of the NREL 5MW reference wind turbine. OpenVSP is a parametric geometry modelling tool that allows users to swiftly model configurations and generate geometry that can be utilized by higher-order tools, such as the invented VLM described herein. Using the turbine structural and aerodynamic properties, the NREL 5MW reference turbine was modeled in OpenVSP, with density of spanwise and chordwise panels specified. Subsequently, a plate geometry was generated and imported into MATLAB, to which blade camber was added to reproduce the camber line. A plot of the blade geometry is shown in FIG. 2.

Figure 3:
FIG. 3 shows a model of a blade camber surface in greater detail.

FIG. 3 shows a magnified view of the blade camber surface. As can be seen in FIG. 3, the number of chordwise panels used in this illustrated embodiment is 4, from leading edge to trailing edge. Additionally, the number of spanwise sections for the baseline wind turbine used are 43.

Figure 4:
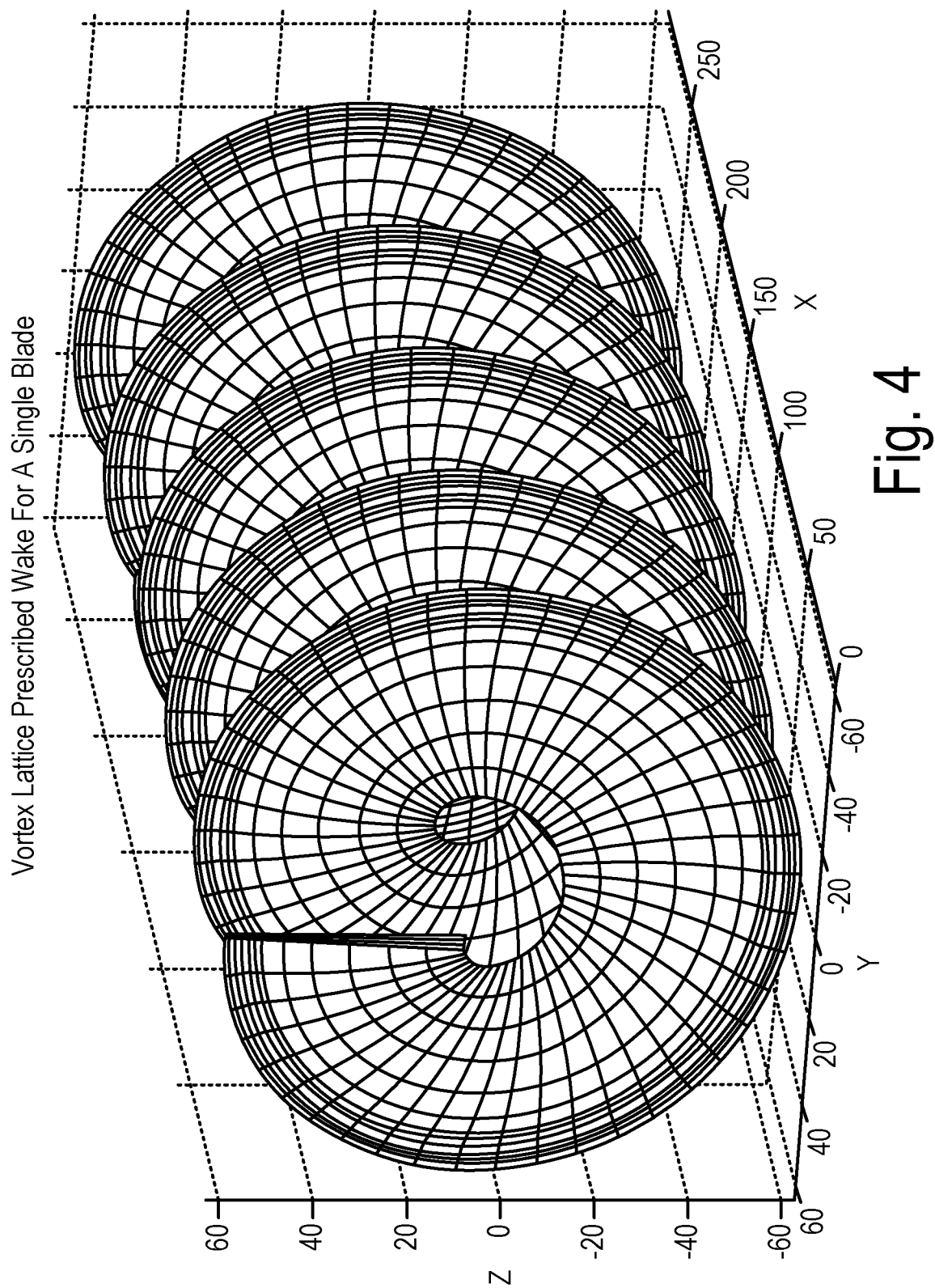
FIG. 4 is a three-dimensional plot showing a wake generated by a typical turbine blade.

As described above, after importing the geometry into MATLAB, the prescribed wake is generated, collocation points computed and vortex rings overlaid on the blade and wake panels. Following this, circulation distributions, induced velocities and effective angles of attack are calculated to obtain power generated. FIG. 4 shows the blade geometry and the prescribed wake generated for one blade in the implemented VLM. Validation and results are presented below.

As with any computational tool, it is essential to be able to compare obtained results with those obtained by either experimental methods or results from validated software. In the absence of experimental data to compare to, the VLM implemented herein is compared to results obtained using the lifting line module in QBlade, an open source simulation software for wind turbines developed at the Technical University of Berlin. QBlade has been extensively validated against experimental data and results from other codes.

Results are obtained for the NREL 5MW reference wind turbine at a wind speed of 8 m/s, and a tip speed ratio of 7.55, which it has been suggested lead to maximum $C_p$. These operating conditions are fed into QBlade to obtain results, and are used as the freestream inflow velocity and rotational velocity respectively. The results are compared in Table 3.

TABLE 3

COMPARISON OF RESULTS USING DIFFERENT METHODS

| Model | Power Generated (kW) | Coefficient of Power ($C_p$) |
|---|---|---|
| QBlade Lifting Line Model | 2087 | 0.5340 |
| Vortex Lattice Method | 2007 | 0.5134 |
| NREL 5MW Reference | 1884 | 0.4820 |

The variation in the results may be attributed to two primary reasons. The first is that unlike the VLM implemented here, QBlade employs a free wake model. The second cause for variation may be attributed to the fact that QBlade uses a lifting line simulation, unlike the lifting surface simulation employed in this Vortex Lattice Method. Nevertheless, the results shown in Table 2 establish that the VLM implemented here successfully quantifies the benefit of a winglet.

Figure 5:
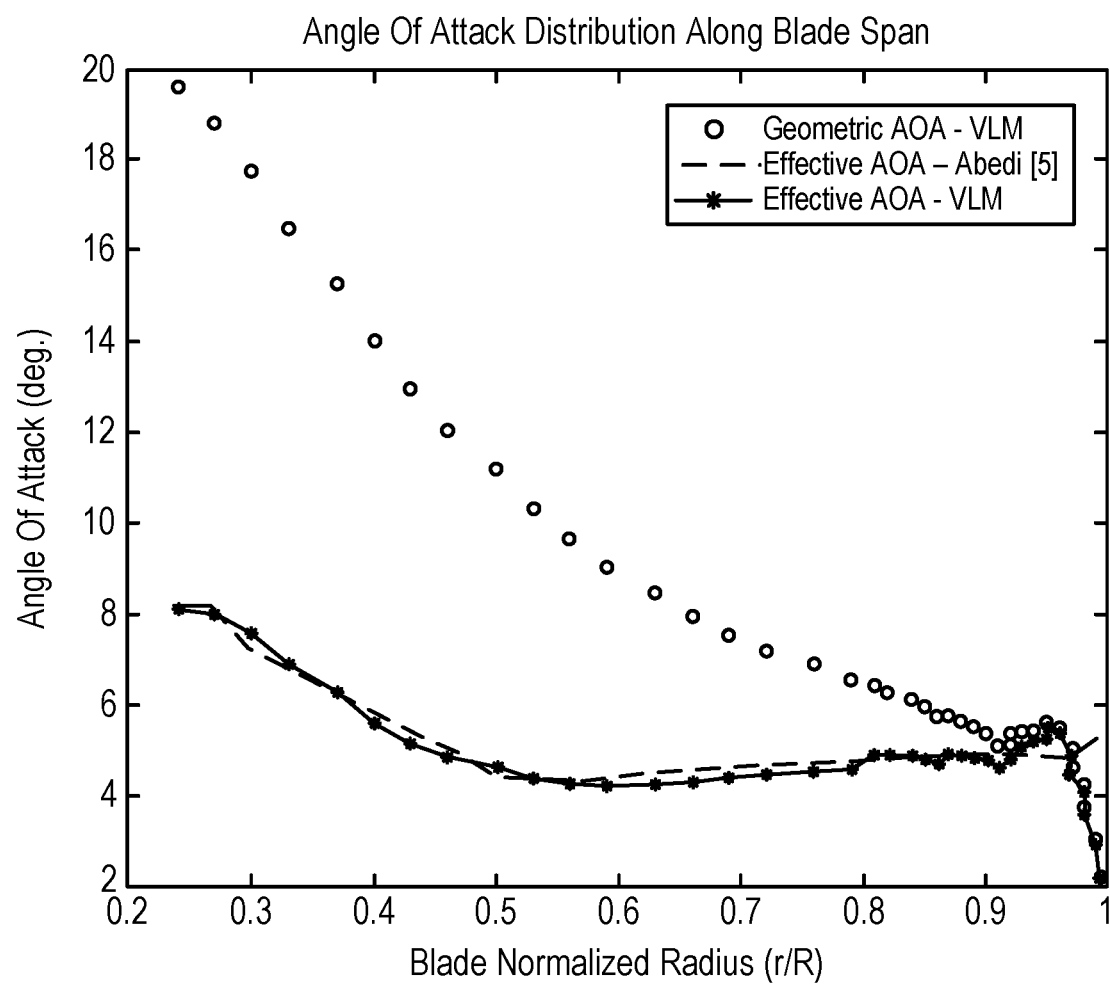
FIG. 5 is a graph comparing results of the modeling of an angle of attack for different computational tools.
Figure 6:
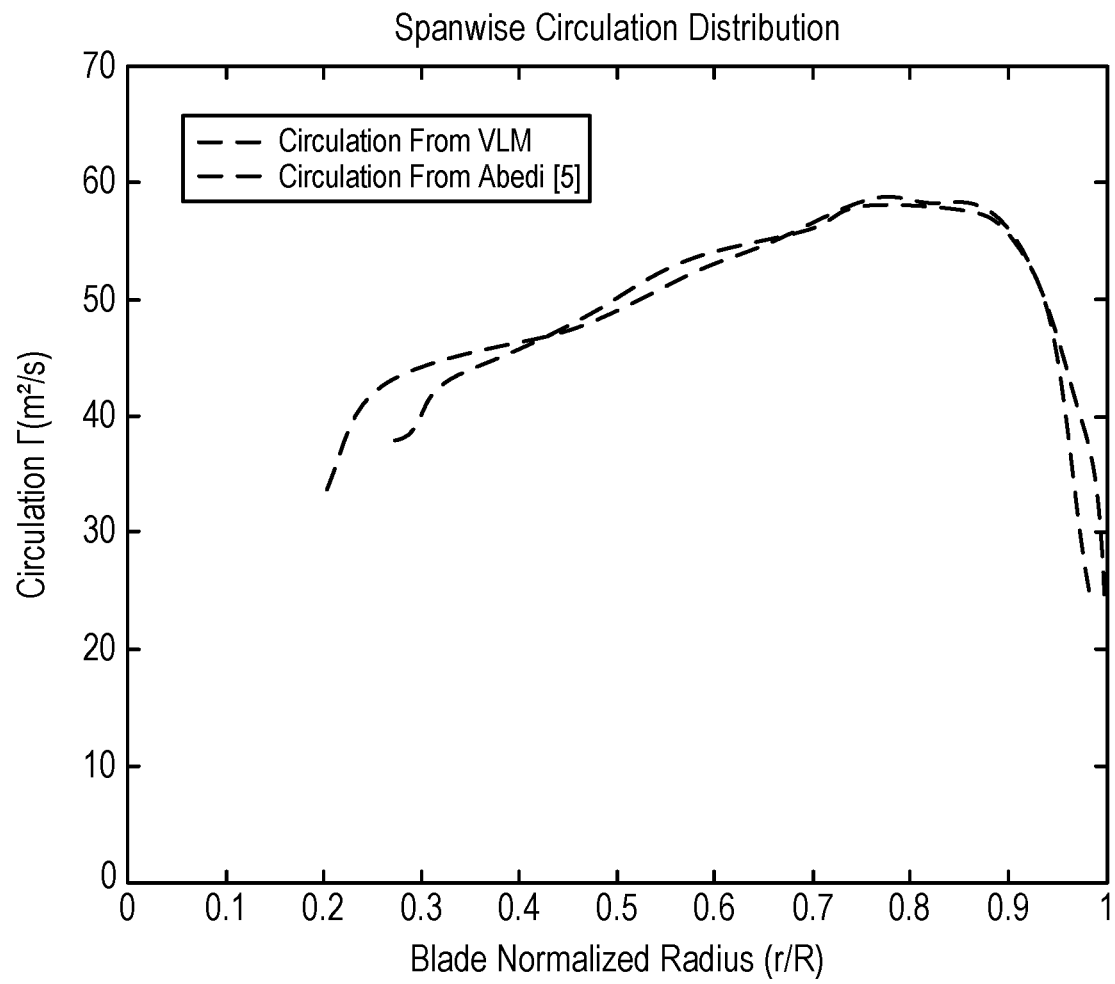
FIG. 6 is a graph comparing a circulation distribution along a blade radius for different computational tools.

In addition to comparisons of $C_p$, circulation and effective angle of attack values are also compared. FIG. 5 depicts the effective angle of attack obtained with the VLM compared to those seen in other studies. Also seen is the geometric angle of attack distribution along the blade obtained with the VLM. In the implemented VLM code, to compute the induced angle of attack along a spanwise segment, the induced velocities of each panel in the chordwise direction is averaged, and this value is used to compute effective angle of attack. This averaging may explain the slight oscillations in angle of attack towards the outboard regions of the blade. FIG. 6 shows the circulation distribution along the blade.

A key differentiator of this disclosure is designing a light winglet at minimum cost that, while providing a measurable improvement in Coefficient of Power ($C_p$), balances the centrifugal force, weight, and normal component of the aerodynamic force. Balancing of the forces minimizes increase in blade root bending moment, negating the need for an exceptionally strong winglet and allowing it to be light. Savings in weight are strongly linked to cost, so a lighter winglet implies a cheaper, more cost effective one. It is thus understood that a winglet that provides maximum increase in $C_p$ may not necessarily be the best design, for it may be too heavy or too expensive. Accordingly, a Figure of Merit (FOM) was developed and used that accurately singles out an optimum design.

Figure 7:
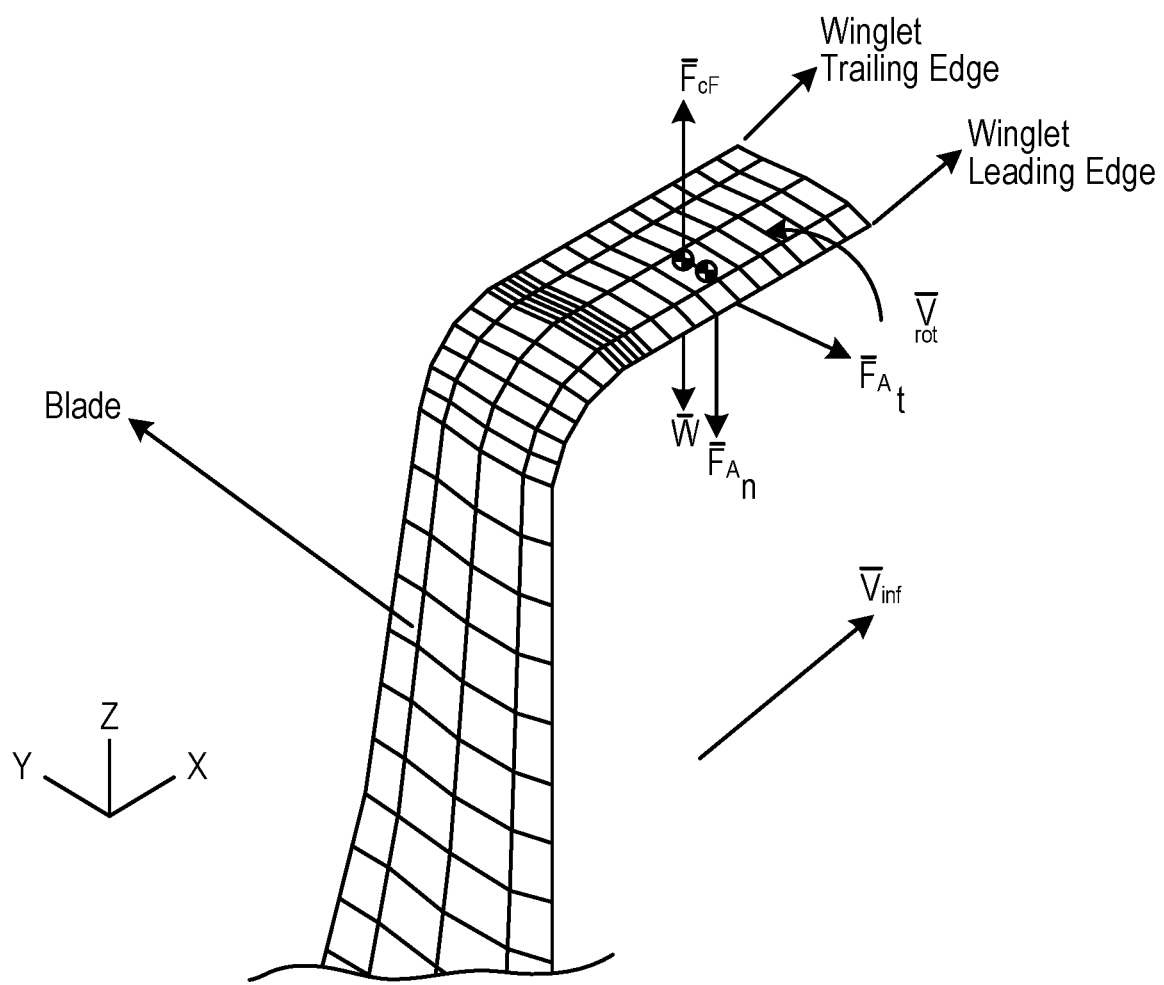
FIG. 7 is a perspective view of a winglet free-body diagram.

A free-body diagram of a winglet at 0° azimuth is shown in FIG. 7. Throughout the blade's revolution, the centrifugal force ($F_{cF}$) and the normal vector of the aerodynamic force ($F_{A_N}$) act in opposite directions. The weight vector ($\overline{W}$), however, always acts downwards. Thus, it is essential to try and maintain weight to a reasonable minimum. Three potential designs are compared herein. With a first embodiment of the disclosure denoted Design A, it is sought to arrive at the lightest and cheapest configuration that can be safely used. Design B is similar to Design A, but with added aluminum connectors to buttress the joint with the main wind turbine blade. Design C acts as a control design which is constructed in exactly the same manner as the main blade. Indeed, Design C can be termed as a retrofit winglet for wind turbines that employs 'traditional construction' techniques. Designs A and B incorporate a foam core, balsa spar, and fiberglass skin. Care is taken to ensure that the foam core is one that does not absorb or retain water in stormy conditions. As Design B calls for aluminum connector rods, an adapter to easily attach it to the end of the turbine blade would be provided.

A sensitivity study has been performed to determine an optimum configuration for the winglet. It is carried out using the implemented vortex lattice method and by varying winglet parameters. Prior to beginning the design process, it is required to determine if the winglet should be bent towards the pressure side or the suction side of the blade. While deflecting winglets to the suction side (downstream) may lead to tower clearance issues, aerodynamic efficiency obtained is greater. Additionally, pointing the winglets upstream means the wind turbine will be operating in its wake. Accordingly, the winglets may preferably be designed to be deflected to the suction side.

Six parameters may be generally considered in the winglet design process:
1. Airfoil
2. Winglet Height
3. Taper Ratio
4. Twist
5. Cant Angle
6. Sweep In the first embodiment disclosed herein, only four parameters are varied. The effects of airfoil and sweep are not described herein. It has been opted to use the same airfoil for the winglet that is used in the final blade section of the baseline NREL 5MW. For determining an optimum height and taper ratio, winglets at 0° twist, and 0° cant angle have been tested at various heights and taper ratios. The baseline NREL 5MW has a rotor overhang of 5 m, shaft tilt of 5°, and precone angle of 2.5°. With a maximum out of plane deflection of 5.5 m, tower clearance is calculated to be 5.148 meters. Maintaining a conservative approach, the maximum winglet height is restricted to half the tower clearance for this specific example.

The sensitivity study shows benefit in using a winglet with a height of 1.9 m and a radius of curvature of 0.5 m. This configuration was used in each of the three designs compared below. The optimum twist angle was determined to be 0°.

Figure 8A:
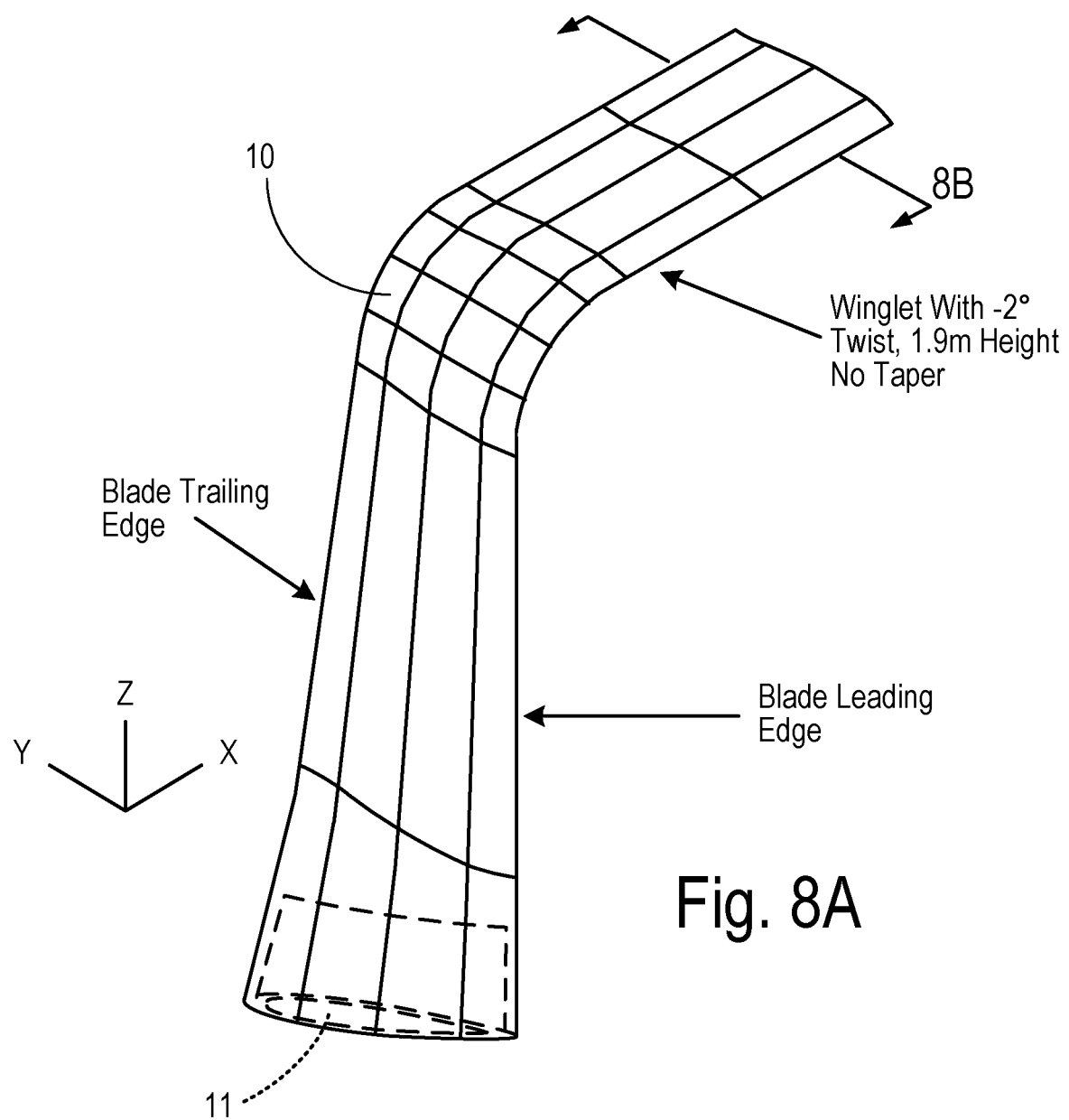
FIG. 8A is a perspective view showing a first embodiment of a winglet.
Figure 8B:
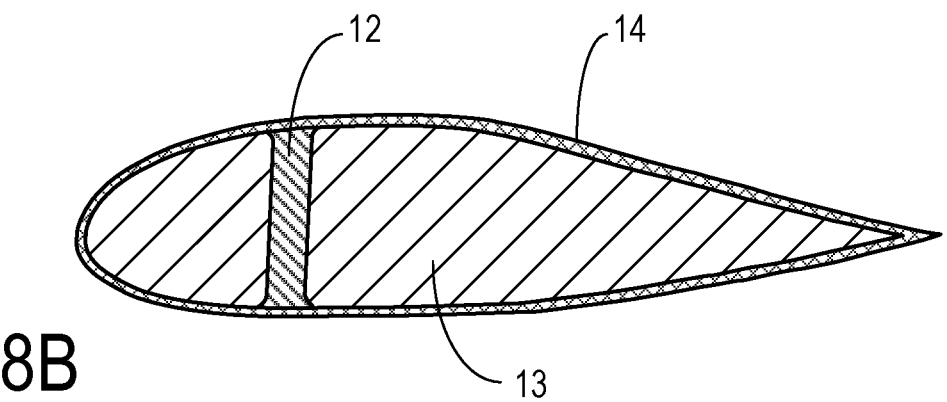
FIG. 8B is a side cross-sectional view of the winglet of FIG. 8A along line 8B.

Design A, depicted in FIGS. 8A and 8B, has been envisioned as a 'sleeve' winglet 10, having an end pocket 11 that can be slipped onto the end of the turbine blade and adhesively bonded, negating a need for an adaptor or connector. Accordingly, the winglet 10 is designed with a foam core 13 embedded with a load bearing balsa spar 12. A chopped strand mat fiberglass skin 14 wetted with resin forms a light shell that can bear loads. A thin layer of gel coat on skin 14 (1.5 mils) provides a smooth finish. The winglet mass estimate is detailed in Table 7. In order to prove that the designed winglet can withstand operational loads, basic structural analysis is done using strength of material techniques, determining tensile and compressive strengths of the winglet.

TABLE 7

MASS ESTIMATE - WINGLET A

| Component | Required Quantity | Mass |
| --- | --- | --- |
| Foamular ® 150 Rigid XPS Foam | 0.5296 m³ | 11.03 kg |
| Balsa Spar | 1.9 m spar of φ = 8 cm | 1.48 kg |
| E-Glass Chopped Strand Mat (US Composites 0.75 oz CSM) | 7.56 m² | 1.73 kg |
| Polyester Resin (US Composites 435 Standard Polyester Resin) | 2.43 liter | 2.92 kg |
| Gel Coat (US Composites Pure White Gel Coat) | 284 mL | 0.34 kg |
| NET MASS OF ONE WINGLET | | 17.5 kg |

Figure 9:
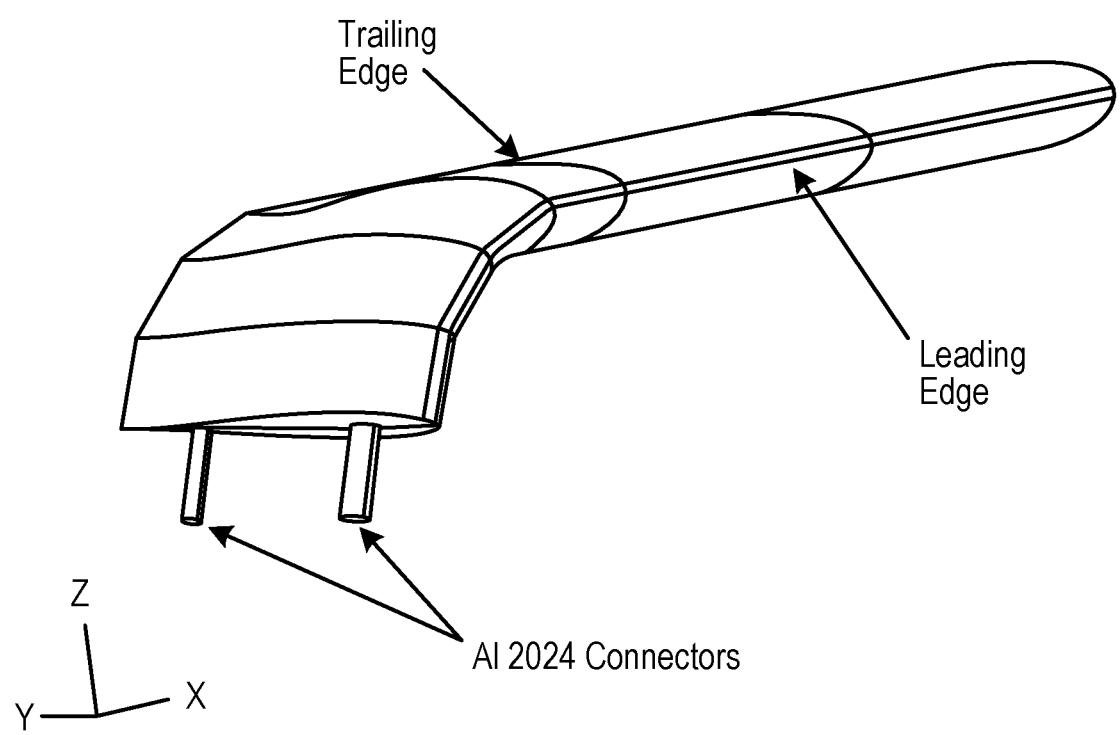
FIG. 9 is a perspective view showing a second embodiment of a winglet.

Design B, depicted in FIG. 9, preserves the basis of Design A: e.g., foam core, fiberglass skin, and balsa spar. The only marked difference is that more traditional connectors are designed using SAE 2024 aluminum. Two circular female connectors of length 25 cm are embedded in the winglet at the quarter chord and three quarter chord points. The first connector (at the quarter chord point) is designed with an outer diameter of 10 cm and an inner diameter of 8 cm. The second connector has an outer diameter or 6 cm and an inner diameter of 5 cm. An adapter with two male connectors would be bolted on to the end of the wind turbine blade. A provision is preferably made on both sets of connectors to allow two 0.75 inch SAE 304 18-8 stainless steel bolts to hold the winglet in place. The bolts are designed to be in double shear. Similar to Design A, basic structural analysis has been performed to prove that the winglet in FIG. 9 can withstand operational loads. The cost breakdown of Design B is exactly the same as Design A, with the added cost of Al 2024 and added labor charges for metal work. The mass estimate of Design B is presented in Table 9.

TABLE 9

MASS ESTIMATE - WINGLET B

| Component | Required Quantity | Mass |
| --- | --- | --- |
| Foamular ® 150 Rigid XPS Foam | 0.5296 m³ | 11.03 kg |
| Balsa Spar | 1.9 m spar of φ = 8 cm | 1.48 kg |
| E-Glass Chopped Strand Mat (US Composites 0.75 oz CSM) | 7.56 m² | 1.73 kg |
| Polyester Resin (US Composites 435 Standard Polyester Resin) | 2.43 liter | 2.92 kg |
| Gel Coat (US Composites Pure White Gel Coat) | 284 mL | 0.34 kg |
| Al 2024 | 4.86 kg | 4.86 kg |
| NET MASS OF ONE WINGLET | | 22.36 kg |

Design C reflects a more 'traditional' approach to winglet structure. For this design, it is assumed that the winglet is constructed in exactly the same manner as the main blade. A winglet mass density would be similar to the blade mass density at the blade tip, that is, 10.32 kg/m.

TABLE 11

MASS ESTIMATE - WINGLET C

| Mass per unit length | Total winglet length | Total mass |
| --- | --- | --- |
| 10.32 kg | 2.64 m | 27.34 kg |

Figure 10:
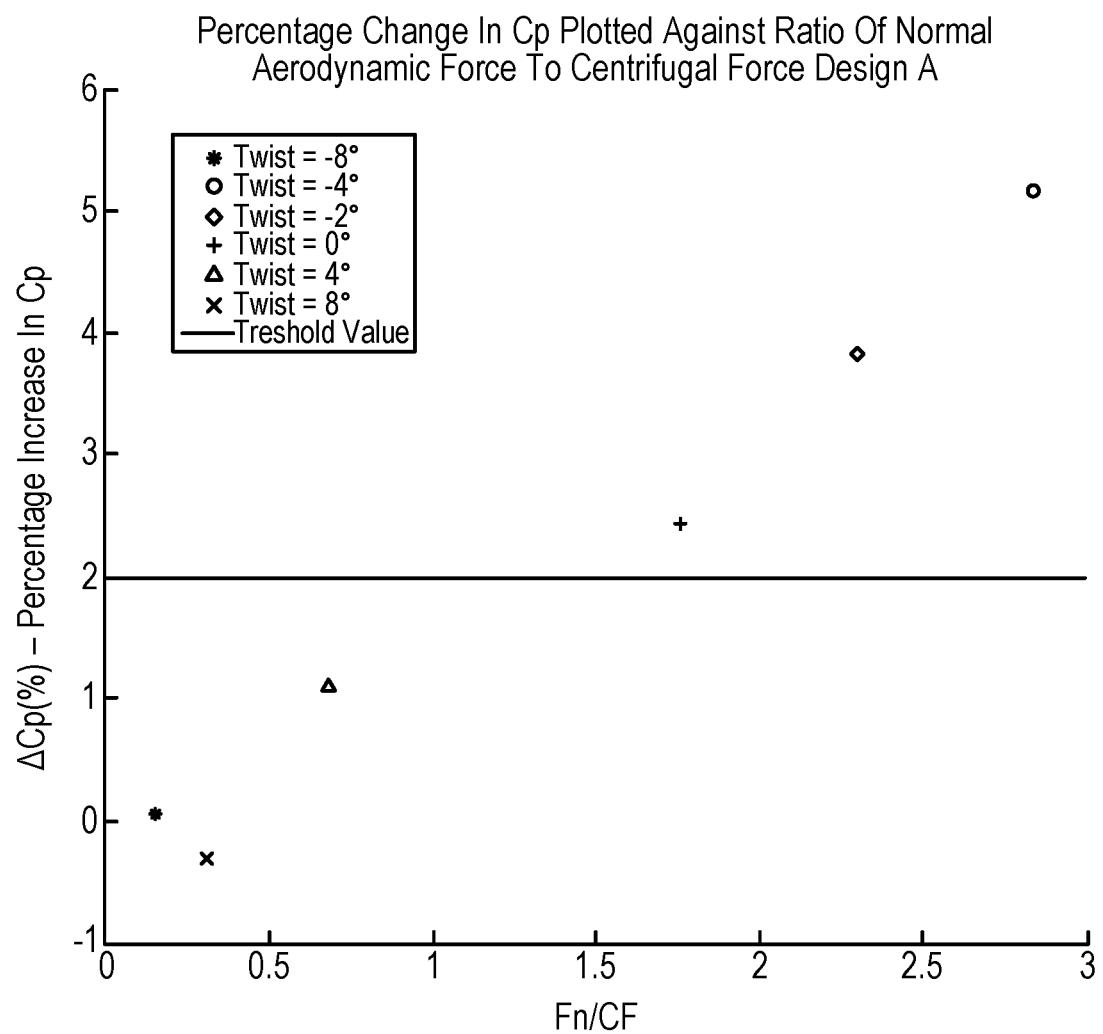
FIG. 10 is a graph showing increase of a coefficient of power at different ratios of normal to centrifugal forces for the embodiment of FIG. 8.

The sensitivity study previously described yielded that for maximum benefit, a winglet designed for the NREL 5MW reference wind turbine should have a height of 1.9 m, a radius of curvature of 0.6 m, and no taper. This is established by observing which configuration offers the greatest improvement in $C_p$. With this configuration, various twist angles have been investigated. The objective with this set of iterations is to determine what twist angle offers maximum improvement in $C_p$, while being cognizant of the ratio of centrifugal force to the normal aerodynamic force. Since the baseline wind turbine exhibits maximum $C_p$ at an inflow speed of 8 m/s and rotational speed of $\Omega=0.9587$ rad/s, the winglets are tested at these conditions. A plot of improvement in $C_p$ against the ratio of forces for Design A is presented in FIG. 10. While the efficacy of the implemented VLM has been demonstrated through comparison with established results, it is essential to keep in mind that these are approximate results. The model does not take into account, for example, a free wake or increased roughness due to soiling of the blade. Accordingly, a threshold in improvement of $C_p$ has been established, below which the winglet design is disregarded even if normal and centrifugal forces are perfectly balanced. The selected threshold value is 2% $\Delta C_p$, that is, unless a winglet offers an improvement of 2% in the coefficient of power, it is disregarded. This value is picked arbitrarily with the aim of accounting for assumptions made in implementing the VLM method.

Although arbitrary, it is a conservative value, and should account for any imperfections in the VLM method. Similarly, unless the ratio of normal aerodynamic force to centrifugal force is between 0.75 and 2, the winglet is disregarded. A ratio of less than 0.75 implies that the winglet is too heavy, while greater than 2 implies that the normal aerodynamic force is far greater than the centrifugal force, and the winglet would require unreasonable amounts of ballast to increase weight. The preferred value of 1.5 leads to acceptable loads throughout the range of operation of the wind turbine.

Figure 11:
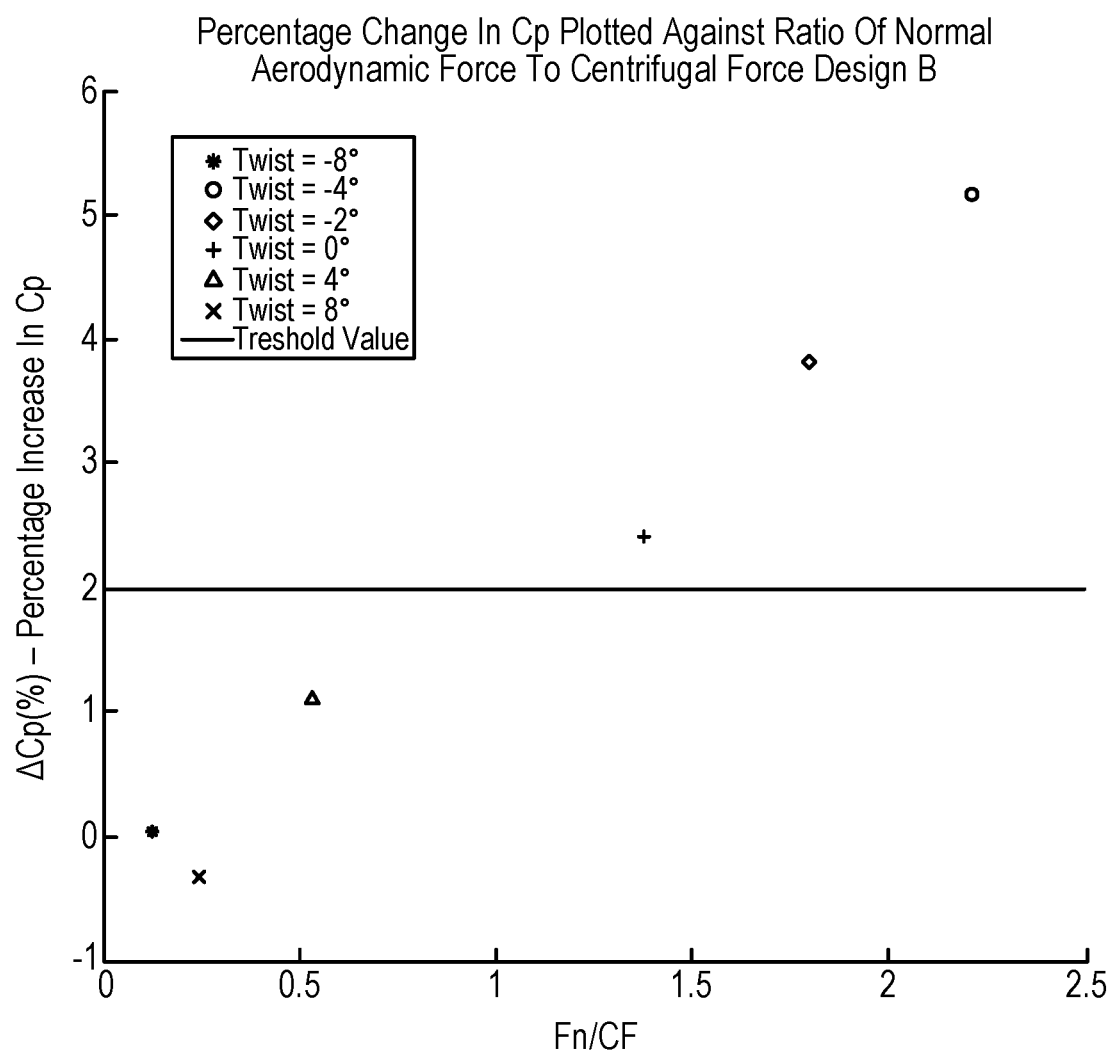
FIG. 11 is a graph showing increase of a coefficient of power at different ratios of normal to centrifugal forces for the embodiment of FIG. 9.
Figure 12:
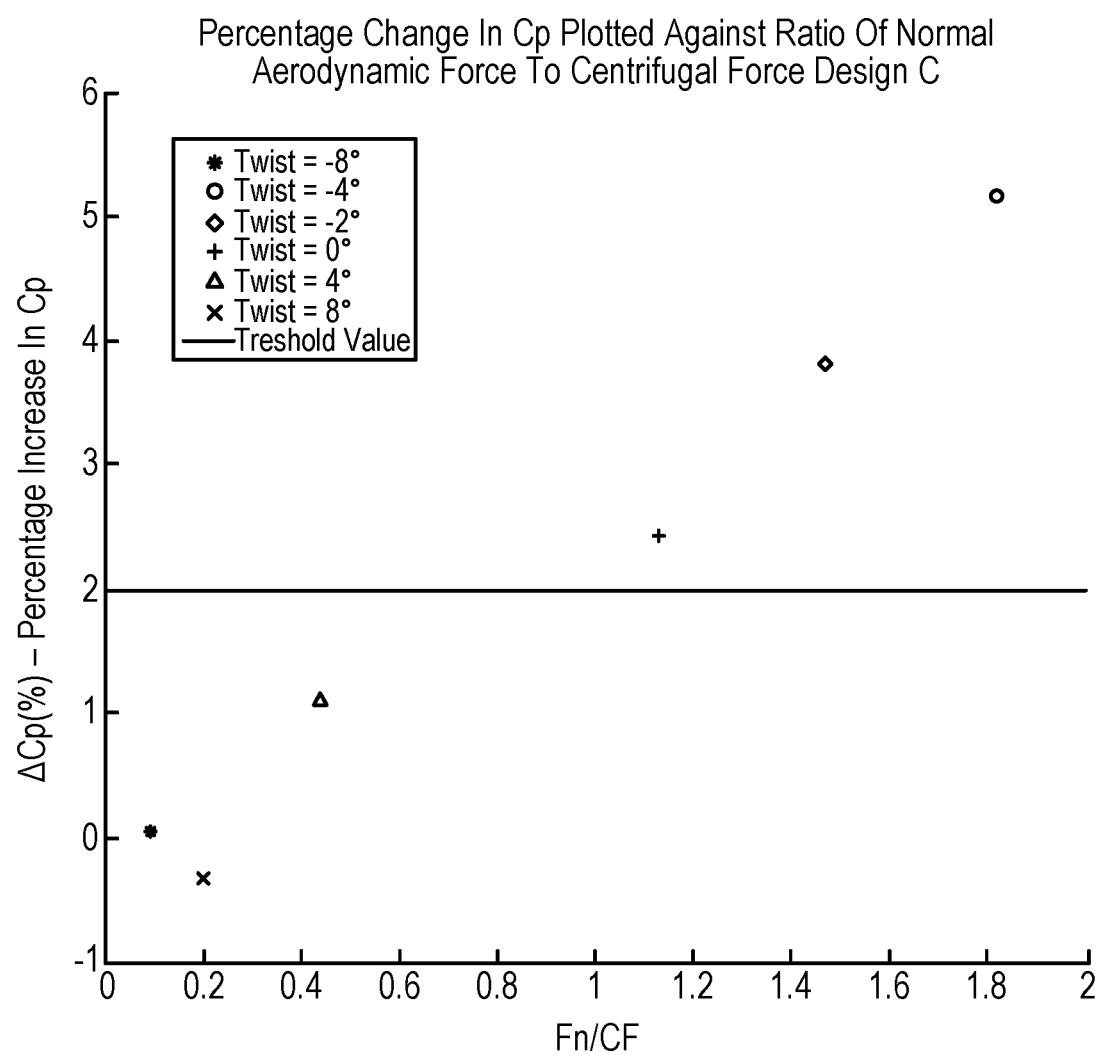
FIG. 12 is a graph showing increase of a coefficient of power at different ratios of normal to centrifugal forces for a conventional blade construction.

Similar studies are done for Designs B and C, shown in FIGS. 11 and 12. As can be seen in all three plots, only three twist settings offer an increment in $C_p$ beyond the threshold value. While a twist of −4° consistently offers the highest increment in $C_p$, it can be seen that the ratio of normal aerodynamic force to centrifugal force is far too high to be acceptable. A twist setting of −2° offers good improvement in $C_p$, but when used with Design A, would require a fair amount of ballast to balance generated centrifugal and normal aerodynamic loads. Not twisting the winglet (0° twist) only offers 2.43% improvement in $C_p$. However, since the ratio of forces is at an acceptable 1.76 for Design A and 1.38 for Design B, it implies minimal need for ballast or reinforcement. Accordingly, all further analyses are done with a twist configuration of 0°.

A summary of the finalized winglet characteristics for Designs A, B and C is presented in Table 13. This winglet configuration is used to determine the net increase in annual energy production, as well as a figure of merit (FOM) for each Design below.

TABLE 13

FINAL WINGLET CHARACTERISTICS

| Twist | 0° |
|---|---|
| Taper ratio | 1 |
| Height | 1.9 m |
| Radius of Curvature | 0.5 m |

TABLE 14

INCREMENT IN ANNUAL ENERGY PRODUCTION

| $C_p$ without Winglets | 0.5134 |
|---|---|
| AEP without Winglets | 21,777.14 MWh |
| $C_p$ with Winglets | 0.5260 |
| AEP with Winglets | 22,146.90 MWh |
| Change in AEP | +369.76 MWh |
| Increase in Revenue (at $0.1083/kWh) | $40,046 |

Figure 13:
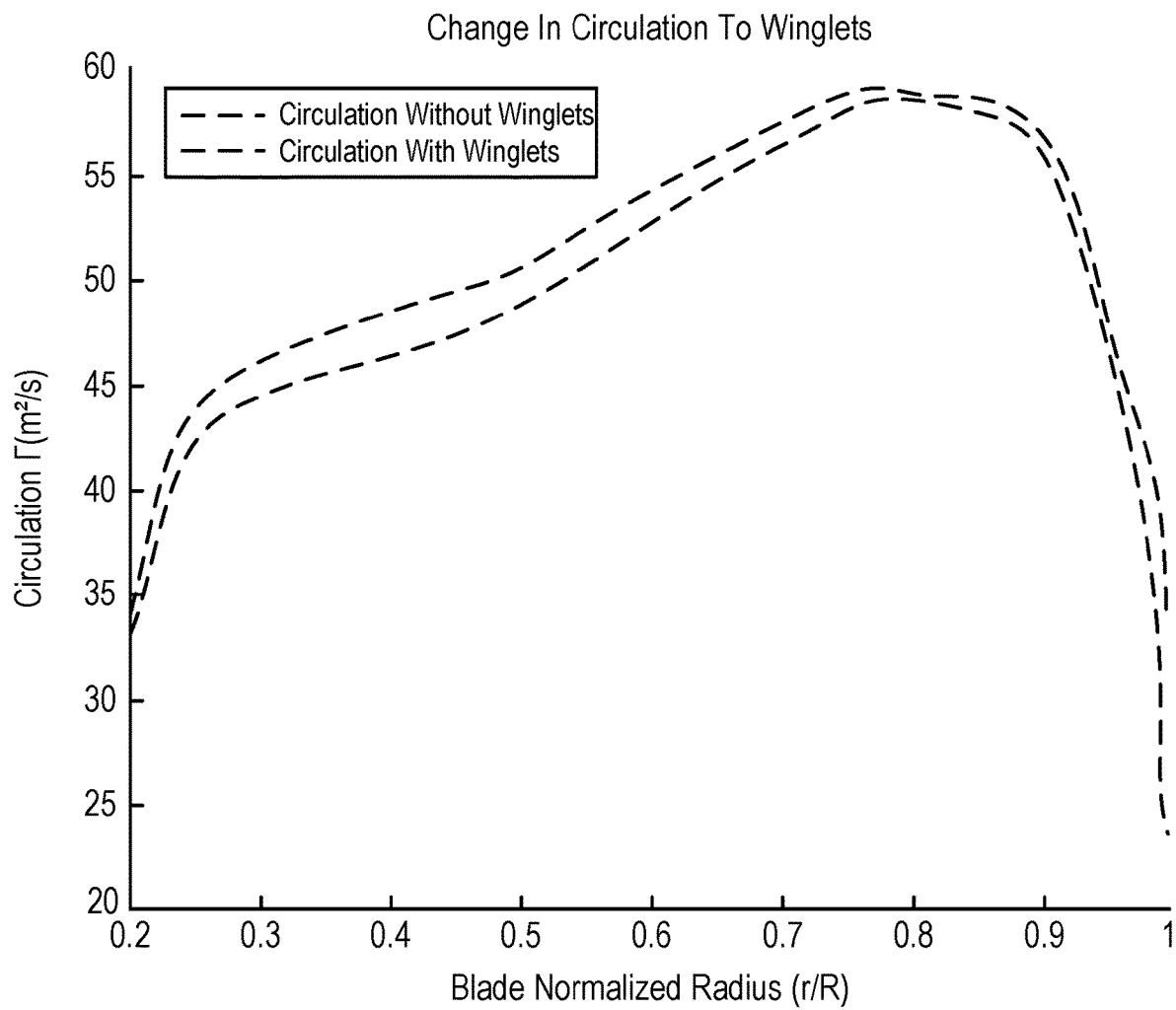
FIG. 13 is a graph showing a change in blade circulation when winglets are added.

The change in circulation over the main blade span is depicted in FIG. 13. As expected, the addition of winglets leads to a decrease in shed vorticity, pushing up the circulation distribution along the blade span. This additional circulation leads to an increase in blade tangential forces, resulting in an increase in $C_p$.

Figure 14:
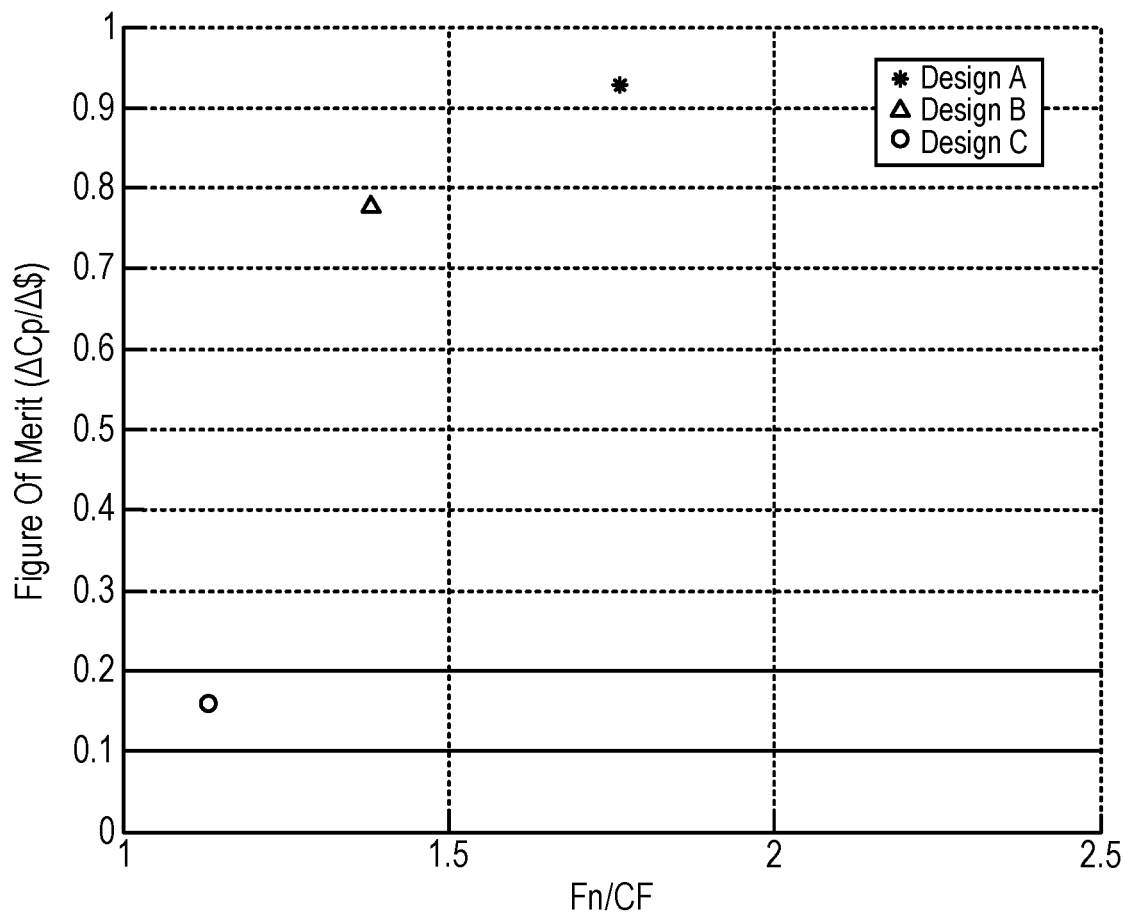
FIG. 14 is a graph comparing a figure of merit for the embodiments of FIGS. 8 and 9 with a conventional blade design.

In order to make comparisons, a Figure of Merit (FOM) is devised as the ratio of the change in percentage of the coefficient of power ($\Delta \% C_p$) to the cost of manufacturing and installing the winglet ($\Delta\$$ in thousands). All three winglet designs (A, B and C) use the characteristics outlined in Table 14. For the optimum winglet design, it was sought that the FOM be maximum (implying maximum increase in $C_p$ at minimum cost), while ensuring that the ratio of normal aerodynamic force to centrifugal force be close to 1.5. The results are presented in FIG. 14. It can be seen that Design A offers the highest FOM of all three designs when forces are close to balanced.

Reduction in tip effects and increase in circulation distribution are the desired results of winglets in wind turbines. However, reduction in tip effects also means the component of force generated in the direction normal to the blade is larger than without winglets. In wind turbines, this force is termed as thrust. Equating a wind turbine to a flat rotor disk, it is possible to understand the thrust as the drag force acting on the flat plate with area equal to that of the rotor disk. Similar to the manner in which a drag coefficient is defined, it is possible to define the coefficient of thrust ($C_T$) as:

$$C_T = \frac{T}{qA} \quad (5.1)$$

Here, T is the thrust force generated by the wind turbine, q is the dynamic pressure and A is the rotor disk area.

Figure 15:
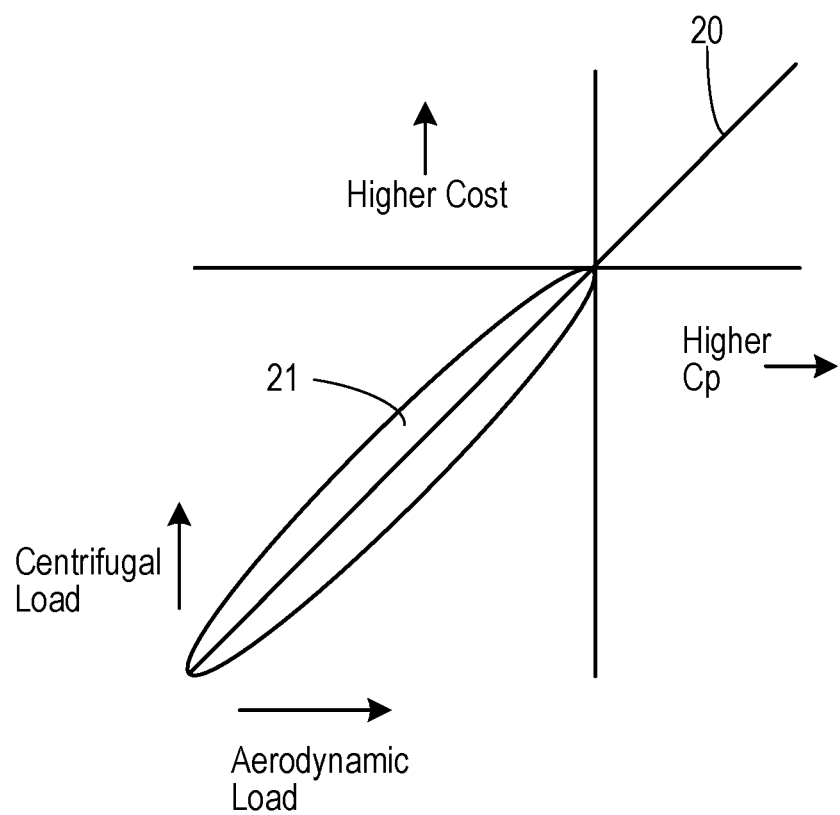
FIG. 15 is a graph illustrating factors in optimizing a winglet design when centrifugal and aerodynamic loads of the winglet is substantially balanced.

FIG. 15 shows a qualitative plot illustrating a design philosophy and optimal design space of the disclosure. The vertical axis shows centrifugal load added by a winglet. The horizontal axis shows aerodynamic load added by a winglet. Diagonal line 20 represents a precise balance of the loads. Any particular winglet design that produces balanced normal aerodynamic and centrifugal loads will create no additional root bending moments, while offering an increase in the power produced. Balancing these forces minimizes an increase in blade root bending moment, negating the need for an exceptionally strong winglet, thereby allowing it to be light and requiring no reinforcement. An aerodynamic load greater than the balanced load may lead to higher Cp, but implies additional blade root bending moment, requiring reinforcement of the blade and driving up cost. Similarly, a centrifugal load greater than the balanced load implies a heavier winglet, once again increasing loads on the winglet and calling for reinforcement. Weight and cost are strongly related, so a heavier winglet implies a more expensive one. Consequently, a region 21 commensurate with balanced centrifugal and aerodynamic loads and which avoids higher costs due to excessive weight and other factors is identified as providing the target performance for a winglet according to the present disclosure.

Large increases in thrust are not desirable, as they yet again would demand a stronger blade to withstand added moments. The net thrust per blade with and without winglets, and the increase in thrust in shown in Table 16. As can be seen, the chosen winglet configuration leads to an increase in thrust of 1%.

TABLE 16

EFFECT ON THRUST DUE TO THE USE OF WINGLETS

| Thrust per blade with winglets (N) | Thrust per blade without winglets (N) | Percentage increase |
|---|---|---|
| 129,463 | 128,179 | 1.00% |

The objective of this disclosure has been to demonstrate retrofit winglets for wind turbines, using a novel design philosophy. In exploring the retrofit aspect, it is sought to improve the maximum power coefficient of the thousands of wind turbines currently in operation using the devised winglet. Emphasis has been laid on designing a winglet that balances generated normal aerodynamic load, centrifugal load, and weight, leading to a winglet that does not lead to unacceptable increases in blade root bending moment. This allows a light, cheap winglet that does not require the main blade to be structurally reinforced to support it, and is economically feasible. Thus, the foregoing has shown:

A vortex lattice method has been written and implemented in MATLAB. It is found that the results compared well with previously published and validated results.

A design philosophy centered around constructing light winglets and balancing generated loads has been adopted. For the NREL 5MW reference wind turbine, a winglet configuration with a height of 1.9 m, radius of curvature of 0.5 m, no taper and twist of 0° is found to be optimum.

The adopted winglet configuration leads to an increase of 2.43% in the maximum coefficient of power.

Three winglet designs were found to be economically viable.

Further Comments on Sensitivity Study:

In order to arrive at optimum winglet height, taper ratio, and cant angle, a sensitivity study is disclosed. For the sensitivity study, the NREL 5MW reference wind turbine is tested with winglets of varying height at conditions of $\bar{v}_\infty=8$ m/s and $\Omega=0.9587$ rad/s using the implemented vortex lattice method and their effect on $C_p$ is analyzed. A height is chosen when further increases in height do not offer appreciable increase in $C_p$. Having selected a height, a range of taper ratios and cant angles are explored, with maximum increase in $C_p$ again being the objective.

TABLE A1

VARIATION OF $C_p$ WITH WINGLET HEIGHT

| Winglet Height (m) | Coefficient of Power |
|---|---|
| No winglet | 0.5134 |
| 1.45 | 0.5246 |
| 1.6 | 0.5248 |
| 1.75 | 0.5251 |
| 1.9 | 0.5254 |
| 2.2 | 0.5259 |

Beyond 1.9 m, the increase in height is not proportional to the increase in $C_p$. Accordingly, 1.9 m is the selected height for the winglet. Using this height, various taper ratios are investigated for the winglet.

TABLE A2

VARIATION OF $C_p$ WITH TAPER RATIO

| Taper Ratio | Coefficient of Power |
|---|---|
| 1 | 0.5254 |
| 0.7 | 0.5253 |
| 0.5 | 0.5252 |

Decreasing taper ratio leads to a drop in $C_p$, so a taper ratio of one is used for the final iteration. Cant angles close 0f 80°, 85° and 90° are investigated. It is necessary to maintain this slim range of cant angles to stick to the design philosophy, that is, balance generated centrifugal load, normal aerodynamic load and weight. Varying cant angle does not lead to appreciable increase in $C_p$, so a cant angle of 90° is used.
Further Comments on Structural Analysis:

An analysis using basic strength of materials relationships is done to quantify the strength of the designed winglet. Designs A and B use an identical structure, with a foam core, a load bearing balsa spar, and a chopped strand mat fiberglass skin. Design B also has additional aluminum (Al 2024) connectors.
Foamular® 150 Rigid XPS Foam The material properties of Foamular® 150 Rigid XPS Foam is available in literature published by the manufacturer. This foam has a density of 20.82 kg/m³, and a compressive strength of 103 kPa.
Balsa Spar The employed Balsa spar has a diameter of 8 cm. Compressive strength is 12.1 MPa and tensile strength is 13.5 MPa.

Maintaining a conservative approach, the maximum bending stress faced by the winglet is computed by assuming half the maximum load acts only at the spar tip, leading to a large value of bending moment. In reality, the load is distributed along the spar, so this approach works in a large factor of safety. For Design A:

TABLE B1

MAXIMUM LOAD AT RATED SPEED

| Weight | Maximum Normal Aerodynamic Load | Maximum Centrifugal Load |
|---|---|---|
| 155.38 N | 1784.02 N | 975.67 N |

So the maximum bending stress calculated is:

$$\sigma = \frac{BM \cdot y}{I} \quad (B2.1)$$

Using the dimensions of the balsa spar and the calculated loads, the maximum bending stress is calculated as 11.62 MPa.
Fiberglass Skin To calculate the strength of the fiberglass composite, a volume fraction of 50/50 is used. Thus, the tensile modulus of the composite is calculated as:

$$\text{Tensile modulus of composite} = V_f E_f + V_r E_r \quad (B3.1)$$

Here, $E_f$ and $E_r$ are values of tensile modulus for the fiber and resin respectively. The computed tensile modulus for the composite is 45.04 GPa. To determine the strength of the composite, the strain at failure is computed for the resin and fiber, and the one which fails first dictates the tensile strength of the composite.

$$\varepsilon_f = \frac{\sigma_f}{E_f} \quad (B3.2)$$

$$\varepsilon_r = \frac{\sigma_r}{E_r} \quad (B3.3)$$

It is seen that the resin has a lower strain of failure at 0.0161. So the tensile strength of the composite is calculated as:

$$\text{(Tensile modulus of composite)} \times \text{(strain at failure of resin)} \quad (B3.4)$$

The tensile strength of the composite is calculated as 0.725 GPa.
Connectors for Design B As mentioned above, the connectors in design B utilize two SAE 304 stainless steel bolts in double shear to attach the winglet to the blade. The tensile strength of SAE 304 stainless steel is 585 MPa, while its ultimate yield strength is 240 MPa. The calculated ultimate tensile and yield strengths are 68.77 kN and 167.03 kN respectively. The shear strength of the bolts are 100.22 kN, and since the bolts are in double shear, the shear strength is calculated as 200.44 kN.

What is claimed is:
1. A wind turbine comprising:
   a main blade arranged for wind-driven rotation in a vertical plane; and
   a winglet extending from a tip of the main blade away from the vertical plane, wherein a coefficient of power Cp of the main blade and winglet is at least 2% greater than a coefficient of power Cp of the main blade alone, and wherein a ratio of normal aerodynamic force generated by the winglet to centrifugal force generated by the winglet during rotation at a nominal speed is in a range between 0.75 and 2;
   wherein the winglet has a twist of 0°;
   where the winglet has a taper ratio of 1.
2. The wind turbine of claim 1 wherein the winglet has a height between 1.7 meters and 2.1 meters and a radius of curvature between 0.45 meters and 0.55 meters.
3. The wind turbine of claim 1 wherein an increased thrust generated by the winglet is less than about 1%.

4. The wind turbine of claim 1 wherein the winglet is comprised of:
a load bearing balsa spar;
a foam core embedded with the spar; and
a fiberglass skin over the spar.

5. The wind turbine of claim 4 wherein the fiberglass skin provides a sleeve adapted to slip onto an end of the main blade to be adhesively bonded.

6. The wind turbine of claim 4 wherein the main blade is configured to receive an adapter bolted to the main blade and providing male connector extensions, wherein the winglet further comprises female sockets for receiving the male connector extensions.

7. A winglet for retrofitting to a main blade of a wind turbine, comprising:
a load bearing balsa spar;
a foam core embedded with the spar; and
a fiberglass skin over the spar;
wherein the winglet is configured to extend from a tip of the main blade away from a vertical plane of the main blade, wherein a coefficient of power Cp of the main blade and winglet is at least 2% greater than a coefficient of power Cp of the main blade alone, and wherein a ratio of normal aerodynamic force generated by the winglet to centrifugal force generated by the winglet during rotation at a nominal speed is in a range between 0.75 and 2;
wherein the winglet has a taper ratio in an inclusive range of from 0.5 to 1.

8. The winglet of claim 7 wherein the winglet has a twist of 0° and the taper ratio is 1.

9. The winglet of claim 8 wherein the winglet has a height between 1.7 meters and 2.1 meters and a radius of curvature between 0.45 meters and 0.55 meters.

10. The winglet of claim 7 wherein an increased thrust generated by the winglet is less than about 1%.

11. The winglet of claim 7 wherein the fiberglass provides a sleeve adapted to slip onto an end of the main blade to be adhesively bonded.

12. The winglet of claim 7 wherein the main blade is configured to receive an adapter bolted to the main blade and providing male connector extensions, wherein the winglet further comprises female sockets for receiving the male connector extensions.

13. A wind turbine comprising:
a main blade arranged for wind-driven rotation in a vertical plane; and
a winglet extending from a tip of the main blade away from the vertical plane, wherein a coefficient of power Cp of the main blade and winglet is at least 2% greater than a coefficient of power Cp of the main blade alone, and wherein a ratio of normal aerodynamic force generated by the winglet to centrifugal force generated by the winglet during rotation at a nominal speed is in a range between 0.75 and 2;
wherein the winglet has a taper ratio in an inclusive range of from 0.5 to 1.

14. The wind turbine of claim 13 wherein the winglet has a twist of 0°.

15. The wind turbine of claim 13 wherein the taper ratio is 1.

16. The wind turbine of claim 13 wherein the winglet has a height between 1.7 meters and 2.1 meters.

17. The wind turbine of claim 13 wherein the winglet has a radius of curvature between 0.45 meters and 0.55 meters.

18. The wind turbine of claim 13 wherein an increased thrust generated by the winglet is less than about 1%.

19. The wind turbine of claim 13 wherein the winglet is comprised of:
a load bearing balsa spar;
a foam core embedded with the spar; and
a fiberglass skin over the spar.

20. The wind turbine of claim 19 wherein the fiberglass skin provides a sleeve adapted to slip onto an end of the main blade to be adhesively bonded.

21. The wind turbine of claim 13 wherein the main blade is configured to receive an adapter bolted to the main blade and providing male connector extensions, wherein the winglet further comprises female sockets for receiving the male connector extensions.

* * * * *